United States Patent
Metcalf et al.

(10) Patent No.: US 11,708,725 B2
(45) Date of Patent: Jul. 25, 2023

(54) DRILL STRING ROTATION BRAKE

(71) Applicant: The Charles Machine Works, Inc., Perry, OK (US)

(72) Inventors: Max A. Metcalf, Stillwater, OK (US); Philip J. Wosmek, Perry, OK (US); Harry Bendure; Rick E. Barrett, Owasso, OK (US)

(73) Assignee: The Charles Machine Works, Inc., Perry, OK (US)

( * ) Notice: Subject to any disclaimer, the term of this patent is extended or adjusted under 35 U.S.C. 154(b) by 87 days.

(21) Appl. No.: 17/352,889

(22) Filed: Jun. 21, 2021

(65) Prior Publication Data

US 2021/0310308 A1     Oct. 7, 2021

Related U.S. Application Data

(63) Continuation of application No. 16/537,807, filed on Aug. 12, 2019, now Pat. No. 11,041,342, which is a continuation of application No. 14/846,156, filed on Sep. 4, 2015, now Pat. No. 10,407,991.

(60) Provisional application No. 62/048,120, filed on Sep. 9, 2014.

(51) Int. Cl.
| | |
|---|---|
| *E21B 7/04* | (2006.01) |
| *E21B 15/04* | (2006.01) |
| *E21B 17/03* | (2006.01) |
| *E21B 19/16* | (2006.01) |
| *F16H 47/08* | (2006.01) |
| *B23Q 5/32* | (2006.01) |
| *B23Q 5/04* | (2006.01) |

(52) U.S. Cl.
CPC .............. *E21B 7/046* (2013.01); *E21B 15/04* (2013.01); *E21B 17/03* (2013.01); *E21B 19/16* (2013.01); *B23Q 5/04* (2013.01); *B23Q 5/326* (2013.01); *F16H 47/08* (2013.01); *Y10T 408/356* (2015.01)

(58) Field of Classification Search
CPC .......... E21B 7/046; E21B 15/04; E21B 17/03; E21B 19/16
See application file for complete search history.

(56) References Cited

U.S. PATENT DOCUMENTS

| | | |
|---|---|---|
| 2,667,820 A | 2/1954 | De Vlieg |
| 3,470,968 A | 10/1969 | Melsheimer et al. |
| 3,512,433 A | 5/1970 | Juhasz et al. |
| 4,078,452 A | 3/1978 | Rosler |
| 7,048,077 B2 | 5/2006 | Veres |
| 7,134,513 B1 | 11/2006 | Randall et al. |

(Continued)

FOREIGN PATENT DOCUMENTS

GB        727603 A     4/1955

*Primary Examiner* — Nicole Coy
(74) *Attorney, Agent, or Firm* — Tomlinson McKinstry, P.C.

(57) ABSTRACT

A rotation brake for stopping rotation of a spindle assembly on a horizontal directional drill. The rotation brake comprises a brake lock that is actuated by a cylinder and spring to interact with a non-rotating brake cap and a rotating pinion, thereby stopping rotation of the pinion. The brake lock is removed from the pinion by applying pressurized fluid to a cylinder such that a cylinder rod moves the brake lock out of a cavity between the brake cap and the pinion. Upon removing fluid pressure from the cylinder, a compressed spring moves the brake lock back to into the cavity, preventing rotation.

20 Claims, 7 Drawing Sheets

(56) References Cited

U.S. PATENT DOCUMENTS

| | | | |
|---|---|---|---|
| 7,389,831 B2 * | 6/2008 | Mullins | ................... E21B 7/046 175/323 |
| 7,628,226 B2 | 12/2009 | Mitchell et al. | |
| 2007/0034458 A1 | 2/2007 | Rogers | |
| 2014/0050522 A1 | 2/2014 | Slaughter, Jr. et al. | |

* cited by examiner

DRILL STRING ROTATION BRAKE

FIELD

This invention relates generally to drive systems for horizontal directional drills.

SUMMARY

The invention is directed to an apparatus for making up and breaking out a pipe segment from a drill string. The apparatus comprises a motor, a pinion, a spindle, and a brake assembly. The pinion is rotationally driven by the motor. The spindle is rotationally driven by the motor and locked to the pinion. The spindle is also connectible to a pipe segment. The brake assembly comprises a brake lock and an actuator. The brake lock at least partially conforms to the pinion. The actuator moves the brake lock between a first position and a second position. The brake lock and pinion are not in contact when the brake lock is in the first position and are rotationally locked when the brake lock is in the second position.

A method of stopping rotation of a spindle assembly for use with a horizontal directional drill. The spindle assembly comprises a spindle, a motor for driving rotation of the spindle, and a pinion rotationally fixed to the spindle. The method comprises rotating the spindle and the pinion, providing a brake lock movable from a first position to a second position, moving the brake lock from the first position to a second position such that the brake lock interacts with the pinion and stops its rotation.

DETAILED DESCRIPTION

Figure 1:
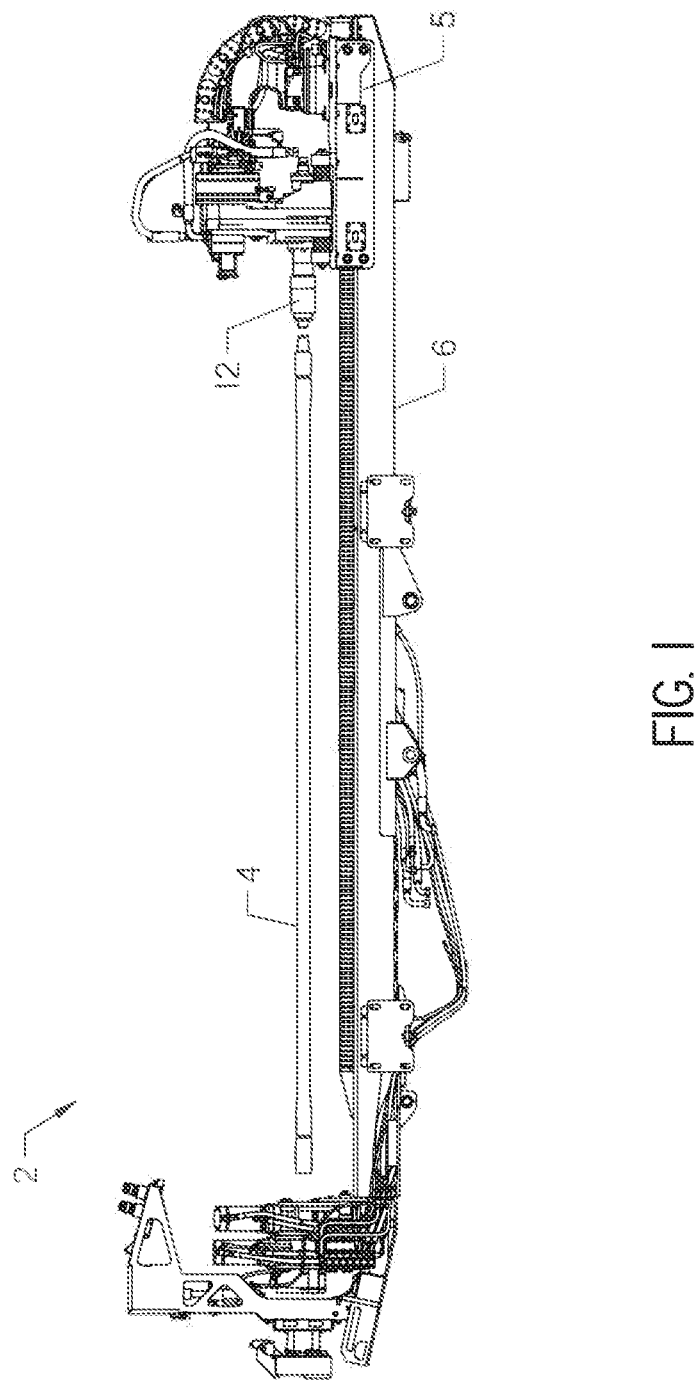
FIG. 1 is a side view of a horizontal directional drill having a pipe segment in position for connection to a spindle assembly.

The present invention is directed to a rotation brake for the spindle on a horizontal directional drill (HDD) system. With reference to FIG. 1, a horizontal directional drill 2 "makes up" pipe segments 4 to form a "drill string", then advances the drill string forward through rotation and thrust provided to a drill bit (not shown). The process is repeated until a borehole of a desired length is created. Also, the HDD system 2 may be used with a "backreamer", wherein a drill string is pulled back through a pilot bore, and thrust and rotation are provided at a backreaming bit to enlarge the pilot bore. In this method, sections of pipe are removed from the drill string by the HDD system as the backreamer is pulled through the bore.

It should be understood that during repetitive drilling operations, a spindle assembly 12 is rotated and advanced by a carriage 5 until the spindle assembly is at its full range of travel forward relative to a drill frame 6. At this point, the spindle assembly 12 is disconnected from the drill string so that the next pipe section can be added to extend the overall length of the drill string. The rotation provided to the output gear during drilling is in a first rotational direction, while a second rotational direction is used when the spindle is unthreaded from the drill string.

Figure 2:
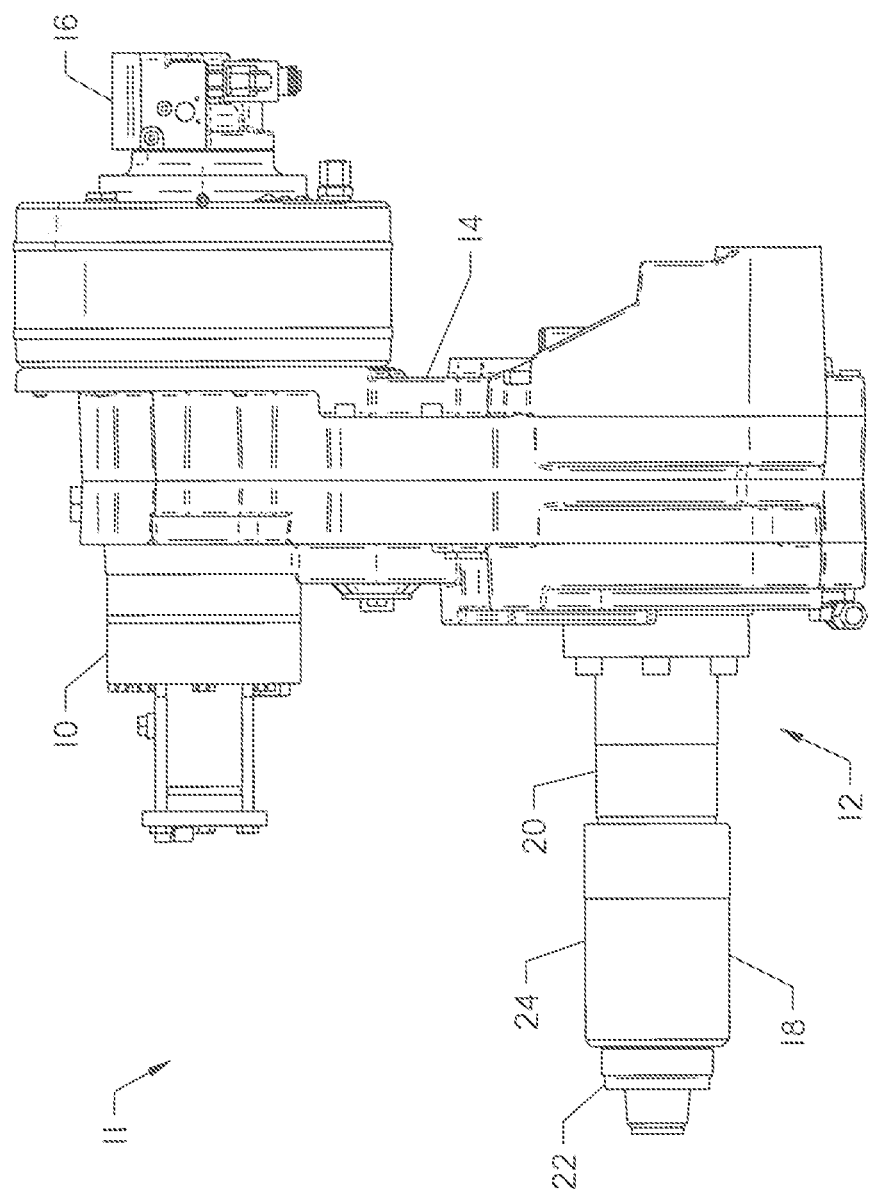
FIG. 2 is a side view of a rotation assembly for use with the horizontal directional drill of FIG. 1.

Turning now to FIG. 2, shown therein is a rotation brake 10 for use with a rotation assembly 11. The rotation assembly 11 comprises the spindle assembly 12, a gearbox 14 and a motor 16. The rotation brake 10 is utilized to stop rotation of the spindle assembly 12. The motor 16 turns a series of intermeshed gears, such as gear and pinion elements 30, 32, 34 (FIG. 3), within the gearbox 14 which, in turn, rotate the spindle assembly 12.

The spindle assembly 12 comprises a drill string connection 18. The connection 18, as shown, comprises a drive chuck, or shaft 20 and a saver subassembly 22. The shaft 20 is preferably connected by a collar 24 to the saver subassembly 22. The saver subassembly 22 is adapted to thread onto pipe segments 4 (FIG. 1) that are being made up and broken out from a drill string. By utilizing the saver subassembly 22, a replaceable part, an operator is insulated from wear associated with repeated threading and unthreading from the segments 4 of drill string. An example of a saver subassembly is shown in U.S. Patent Publication No. 2014/0050522, the contents of which are incorporated herein by reference.

Figure 3:
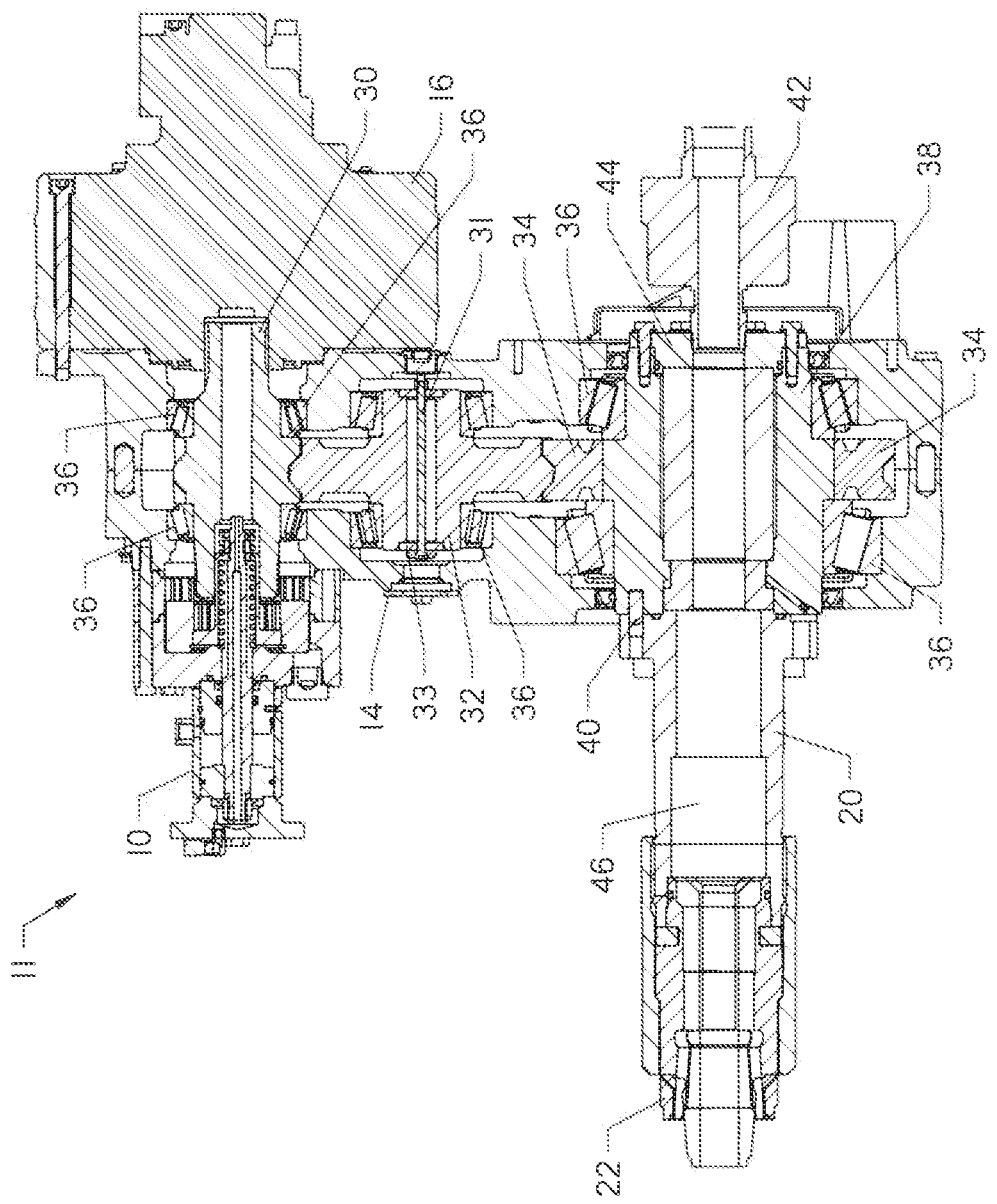
FIG. 3 is a sectional side view of the rotation assembly and rotation brake of FIG. 2.

With reference now to FIG. 3, the rotation assembly 11 of FIG. 2 is shown in section. The gearbox 14 comprises a motor output pinion 30, a central gear 32, and a spindle output gear 34. Each of the motor output pinion 30, central gear 32, and spindle output gear 34 are rotationally supported within the gearbox 14 by bearings 36. The motor output pinion 30 is rotationally driven by motor 16. In turn, the pinion 30 interfaces with central gear 32, which likewise drives spindle output gear 34. The central gear 32 rotates about screw 31 which is connected to the gearbox 14 by a vented washer 33. The vented washer 33 allows gasses within and proximate the central gear 32 to vent to the environment when pressure increases due to rotation of the central gear. The spindle output gear 34 is rotationally locked to output shaft 38, which is connected to the drive chuck shaft 20 of the spindle assembly 12. As shown, the drive chuck shaft 20 is attached to the output shaft 38 by bolts 40. Rotation of the motor output pinion 30, central gear 32, spindle output gear 34 and drive chuck shaft 20, and therefore connected pipe segments 4 (FIG. 1) are driven by the motor 16. Actuation of the rotation brake 10, which will be discussed in further detail with respect to FIGS. 4-7, stops or prevents rotation of these elements.

The rotation assembly 11 further comprises a water swivel 42 attached to the back of the output shaft 40 through an output cap 44. The water swivel 42 is a rotating connection element that allows for drilling fluids, such as water, air, bentonite, and other known fluids, to be provided between a high-pressure pump (not shown) for providing the drilling fluid, and the rotating elements of the drill string and output shaft 40. Fluid provided through the water swivel 42 enters the drill string (not shown) during drilling operations through an internal passage 46 located within the output shaft 40, drive chuck 20, and saver subassembly 22.

Figure 4:
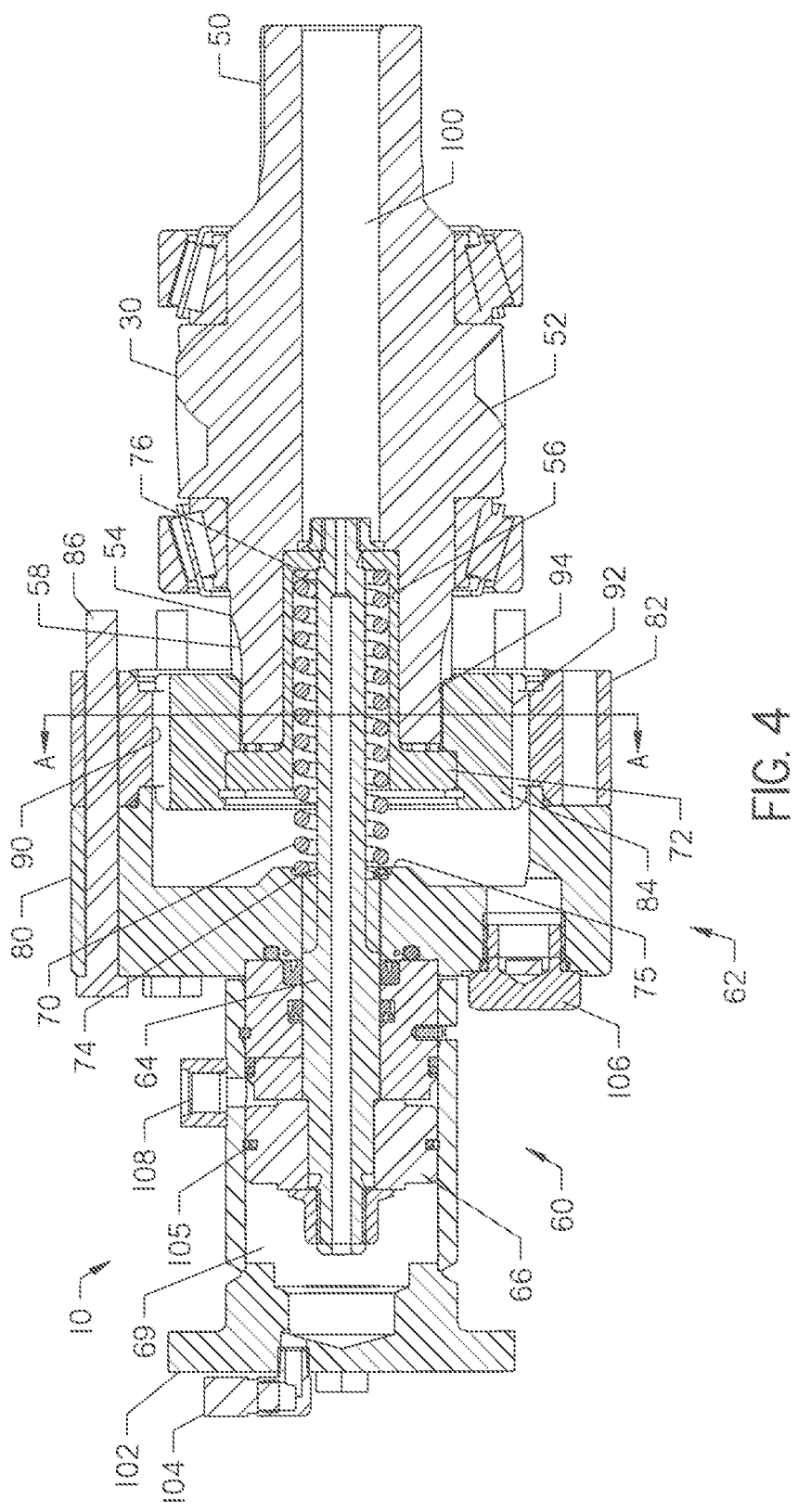
FIG. 4 is a sectional view of a rotation brake shown in FIG. 3 in the engaged position.

With reference now to FIG. 4, the rotation brake 10 is shown in more detail. As shown, the motor output pinion 30 is shown with neighboring elements of the gearbox 14 removed for clarity. The motor output pinion 30 comprises a motor connection 50, a plurality of teeth 52, and a lock interface 54. The motor connection 50 is rotationally driven by the motor 16 (FIG. 3), which turns the entire motor output pinion 30. The teeth 52 interact with the central gear 32 (FIG. 3). The lock interface 54 is sized to engage with the rotation brake 10. As shown, the lock interface 54 comprises an internal cavity 56 and a plurality of external splines 58. The cavity 56 and splines 58 enable the connection between the rotation brake 10 and lock interface 54 as will be discussed in more detail below.

Figure 5:
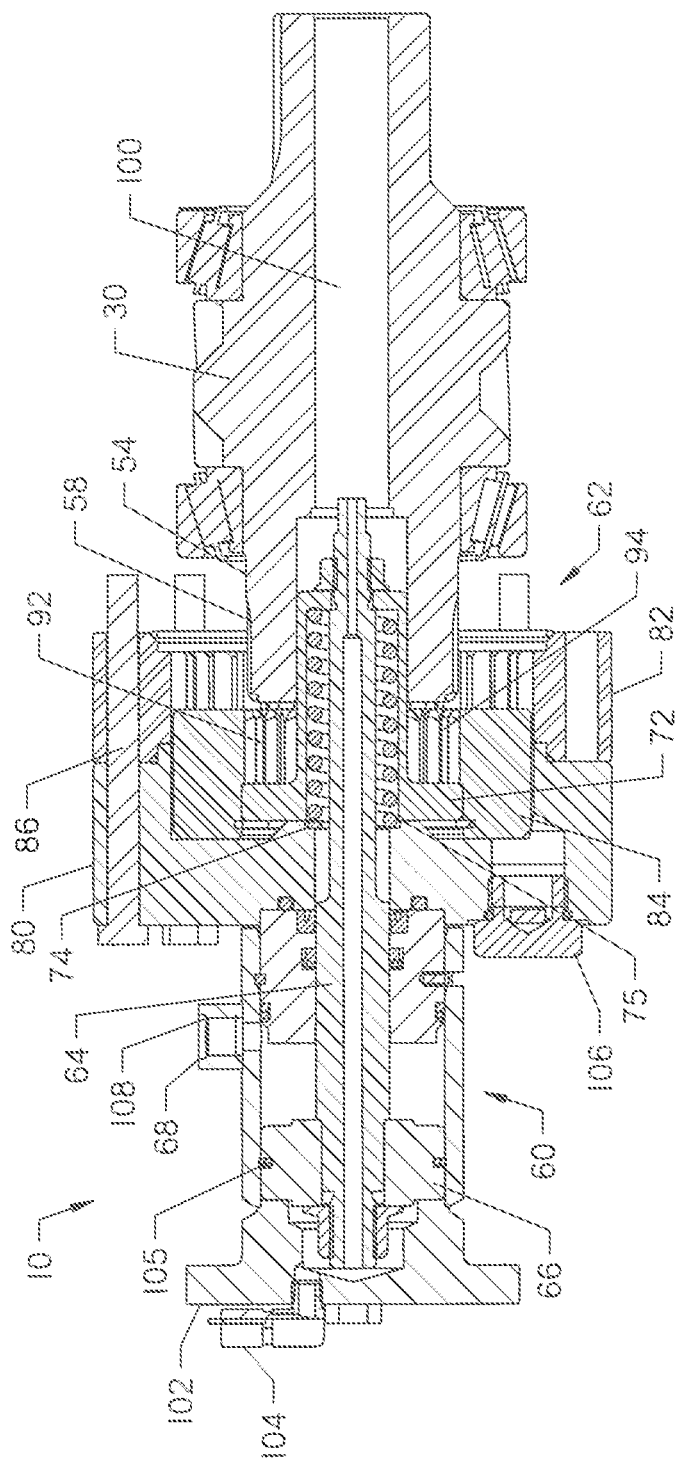
FIG. 5 is a sectional view of the rotation brake of FIG. 4 in the disengaged position.

The rotation brake 10 is movable between an engaged position and a disengaged position. In the engaged position, as shown in FIG. 4, the rotation brake 10 engages the lock interface 54, preventing rotation of the motor output pinion 30 relative to the rotation brake 10. Rotation of the spindle assembly 12 (FIG. 3) will be prevented by the rotation brake 10 being in the engaged position. In the disengaged position, as shown in FIG. 5, the rotation brake 10 does not engage the lock interface 54 and the motor output pinion 30 rotates freely relative to the rotation brake. One of ordinary skill in the art will appreciate that when the rotation brake 10 is moved to the engaged position, it is advantageous to take steps to protect the motor 16 (FIG. 3) from damage. For example, engagement of the rotation brake 10 may cause the motor 16 to be placed into neutral, slowed or stopped.

With reference again to FIG. 4, the rotation brake 10 comprises an actuator assembly 60 and a brake assembly 62. The actuator assembly 60 comprises a cylinder rod 64, a piston 66, a cylinder coupler 68, a hydraulic chamber 69 and a compression spring 70. The compression spring 70 is contained within a spring housing 72 and engaged at a first end 74 to a reaction wall 75 and at a second end 76 to the spring housing. As shown, the spring housing 72 fits within the internal cavity 56 of the motor output pinion 30.

The cylinder rod 64 is coupled to the spring housing 72. Pressurized fluid, such as hydraulic fluid, may be applied to the hydraulic chamber 69 of the actuator assembly 60 through the cylinder coupler 68. The fluid causes the chamber 69 to expand and the piston 66 to move away from the motor output pinion 30. The piston 66 is coupled to the cylinder rod 64. Therefore, as the actuator assembly 60 is activated by fluid, the cylinder rod 64 and spring housing 72 move away from the motor output pinion 30. Additionally, the compression spring 70 is compressed as the distance between the reaction wall 75 and the spring housing 72 decreases.

The brake assembly 62 comprises a brake cover 80, a brake cap 82, and a brake lock 84. The brake cover 8o is attached by connectors 86 to the gearbox 14 (FIG. 2) and not rotatable relative to the gearbox. As shown, the connectors 86 are bolts or screws. The brake cap 82 is attached to the brake cover 8o between the brake cover and the gearbox 14 by the connectors 86. The brake cap 82 is shown as a separate element from the brake cover 80, though these may be integrally formed. The brake cap 82 comprises internal features such as splines 90.

The brake lock 84 comprises external features, such as splines 92 for engaging the splines 90 of the brake cap. Additionally, the brake lock 84 comprises internal features, such as splines 94 for engaging the lock interface 54. The brake lock 84 is attached to the spring housing 72 and thus movable from a first position to a second position by actuation of the actuator assembly 60. In the first position, as shown in FIG. 5, the piston 66 is fully to the left, meaning that the spring housing 72 moves the brake lock 84 such that the splines 94 of the brake lock do not engage with the lock interface 54. Therefore, the rotation brake 10 is in the disengaged position. In the second position, as shown in FIG. 4, the piston 66 is moved to the right by expansion of the compression spring 70, causing the brake lock 84 to be moved into a cavity between the brake cap 82 and the lock interface 54. The brake cap 82 does not rotate, meaning that the brake lock 84 holds the lock interface 54 in place, thus stopping or preventing rotation of the motor output pinion 30. When the brake lock 84 is in the second position, the rotation brake 10 is engaged.

While the actuator assembly 60 is shown with a hydraulically actuated piston 66 and a compression spring 70 moving the cylinder rod 64 in response to changes in fluid pressure, other actuator assemblies may be contemplated, such as dual-action hydraulic cylinders, screw drives, etc. Further, while the compression spring 70 of the current invention biases the rotation brake to an engaged position in the absence of fluid pressure, the opposite configuration may be utilized such that hydraulic pressure is required for activation of the rotation brake.

While the features shown for interaction between the rotation brake 10 and motor output pinion 30 are splines 90, 92, 94, other features may be utilized, such as geometric profiles (for example, hexagonal cavities), rotational stops, etc. Additionally, the interface between the brake lock 84 and brake cap 82, and/or the interface between the brake lock 84 and lock interface 54, may allow for some spring resistance when in the second position to quickly slow then stop rotation of the motor output pinion 30 rather than providing an instantaneous stop.

Rotation of the motor output pinion 30 and actuation of the rotation brake 10 may cause pressure to build up in the gearbox 14. An internal passage 100 exists due to a central bore through the motor output pinion 30, spring housing 72 and cylinder rod 64. The internal passage should allow transmission of pressure changes between the gearbox 14 and a barrel end 102 of the rotation brake 10. An air vent 104 is provided at the barrel end 102 of the rotation brake 10 such that sudden increase and decrease of pressure within the gearbox 14 is translated to the atmosphere, preventing pressure-related resistance to actuation of the rotation brake 10. O-Rings 105 are placed about a periphery of the piston 66 to isolate the air existing in the barrel end 102 from the hydraulic chamber 69 of the barrel end. A mechanical switch 108, pressure sensor, or the like may be provided at the coupler 68 or elsewhere to indicate the hydraulic pressure in the chamber 69. This information may be provided to a control system (not shown) to indicate whether the brake 10 is actuated such that the motor 16 (FIG. 2) may be slowed or placed in neutral.

Figure 6:
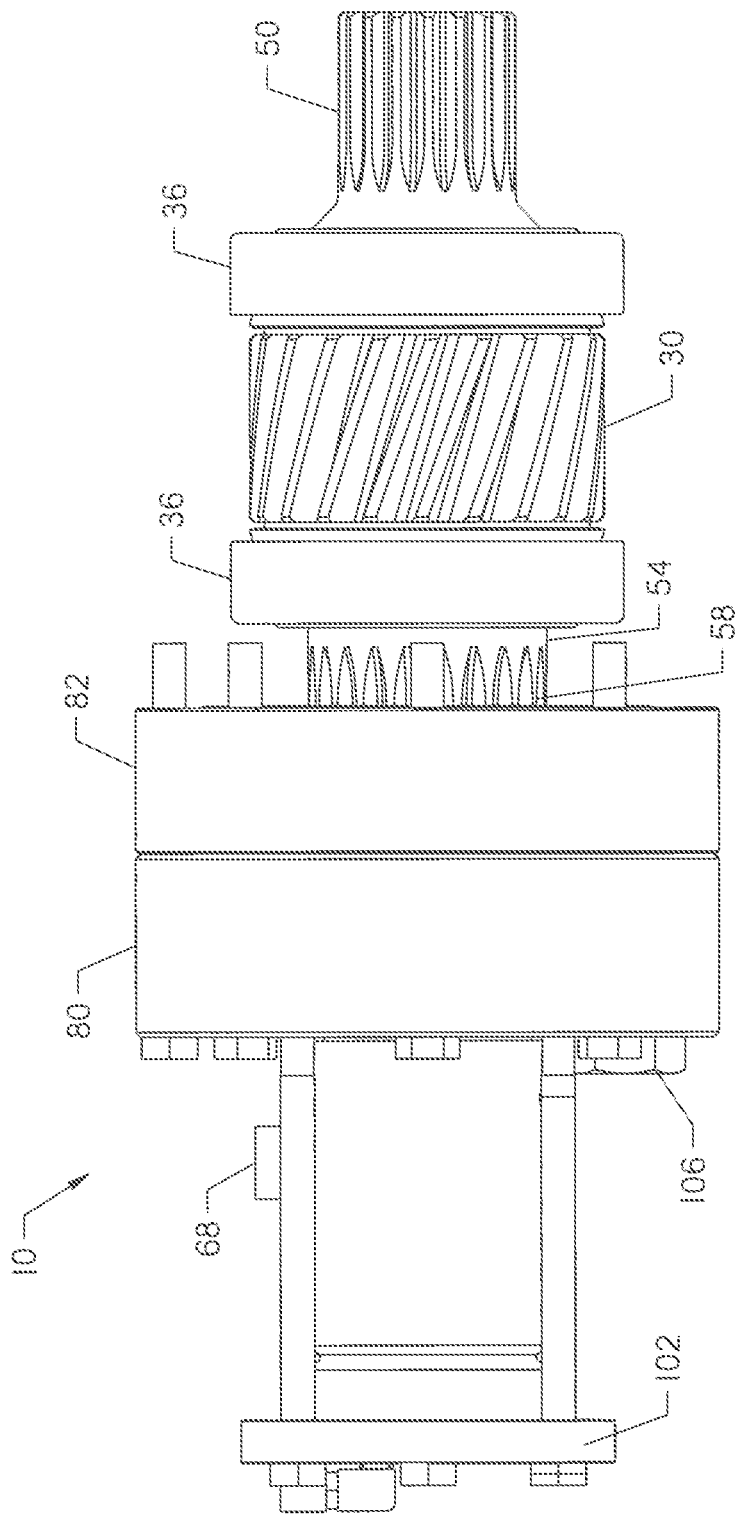
FIG. 6 is a side view of the rotation brake of FIG. 4.

With reference now to FIG. 6, the rotation brake 10 is shown from the side with the gearbox 14 removed. The splines 58 of the lock interface 54 are shown in detail. Preferably, the splines 58 taper from a wider profile proximate rotation brake 10 to a smaller profile further from the rotation brake. In this way, corresponding splines 94 of the brake lock 84 engage more easily with the rotating lock interface 54 upon actuation of the rotation brake 10 while allowing for a tight connection when fully engaged. One of ordinary skill will appreciate that the compression spring 70 allows the brake lock 84 to recoil if the splines 58 of the lock interface 54 and splines 94 of the brake lock 84 do not immediately mate upon actuation of the rotation brake 10. A magnetic plug 106 is provided to access, lubricate and clean the area proximate the brake lock 84 within the brake cover 80. The coupler 68 may be connected to a hose (not shown) or other connection for transmission of pressurized fluid.

Figure 7:
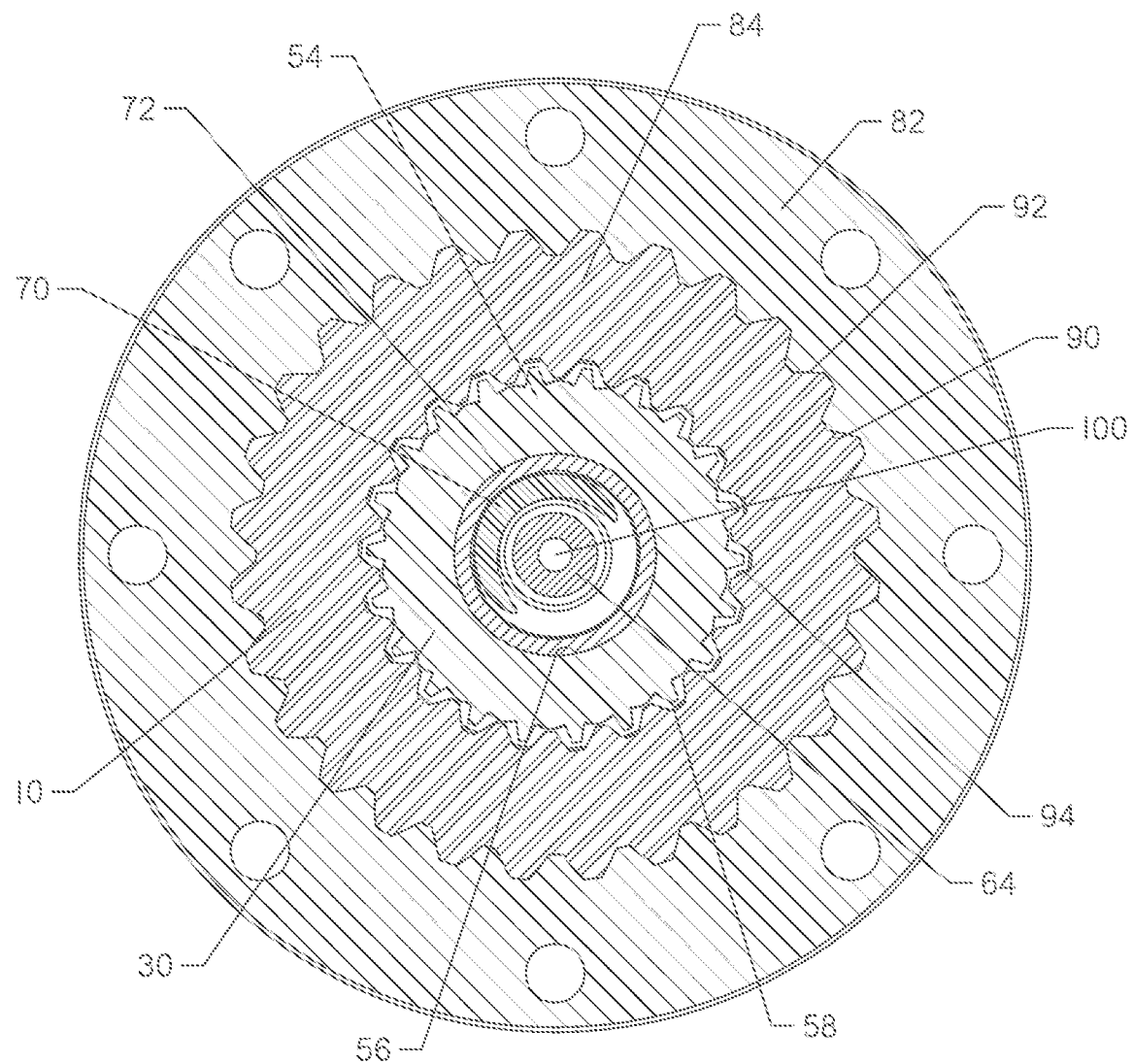
FIG. 7 is a front view of Section A-A of FIG. 4.

With reference now to FIG. 7, a cross-section A-A of FIG. 4 is provided to give clarity to the engagement between the motor output pinion 30 and the rotation brake 10. The splines 90 of brake cap 82 interact with external spines 92 of brake lock 84. The splines 58 of the lock interface 54 interact with internal splines 94 of brake lock 84. Therefore, no relative rotation is allowed between the brake cap 82 and lock interface 54 of the pinion 30 when the brake lock 84 is engaged. The spring housing 72 is located within a cavity 56 of lock interface 54. The spring housing 72 and brake lock 84, as described with reference to FIG. 4, move in concert. As shown in FIGS. 4 and 7, the compression spring 70 provides engagement force to the brake lock 84 and spring housing 72, while actuation of the cylinder rod 64 causes the brake lock 84 and spring housing 72 to move out of engagement with the lock interface 54. The internal passage 100 is shown within the cylinder rod 64 in FIG. 7.

In operation, with the rotation brake 10 disengaged, the spindle assembly 12 is rotated by the motor 16 to connect to a pipe segment 4. The spindle assembly 12 is then advanced along the drill frame 6 while rotating to connect the pipe segment 4 to a drill string. The spindle assembly 12 continues rotation and advancement to advance the drill string into the ground. As shown in FIGS. 4 and 5, the rotation brake 10 is engaged by removal of hydraulic pressure applied through cylinder coupler 68, causing the piston 66 and cylinder rod 64 be pulled by compression spring 70. The brake lock 84 then engages the brake cap 82 and the lock interface 54 of the motor output pinion 30 to cause rotation to stop. Optionally, the motor 16 may be placed into neutral by a control system, such as a mechanical switch 108 (FIGS. 4-5), upon loss of hydraulic pressure in cylinder coupler 68.

The rotation brake 10 is then disengaged, and the rotation of the spindle assembly 12 reversed to disconnect the spindle assembly from pipe segment 4. As shown in FIGS. 4 and 5, the rotation brake is disengaged through addition of hydraulic pressure through cylinder coupler 68, causing the piston and cylinder rod to compress compression spring 70. The brake lock 84 is removed from engagement with and allows relative rotation between the lock interface 54 and brake cap 82. Optionally, the motor 16 may not be activated until after the rotation brake 10 is disengaged, though preferably the rotation brake is powerful enough to disengage the brake lock 84 even when the motor is active. After the spindle assembly 12 is disconnected from pipe segment 4, the brake is engaged, rotation stops, and the spindle assembly is moved back along drill frame 6 to begin an additional iteration of the process.

One of ordinary skill in the art will appreciate that the above steps may be performed substantially in reverse to remove a pipe segment from a pipe string during backreaming operations of the horizontal directional drill 2.

It should be appreciated by those skilled in the art that various modifications and variations can be made in the present invention without departing from the scope and spirit of the invention. It is intended that the present invention cover such modifications and variations as come within the scope and spirit of the appended claims and their equivalents.

The invention claimed is:

1. An apparatus, comprising:
a horizontal directional drilling machine comprising:
 an elongate frame;
 a carriage movable along the frame and comprising:
  a motor;
  a rotatable spindle;
  a series of intermeshed gears configured to rotationally couple the motor to the spindle;
  a brake element disposed in a laterally offset relationship to one of the gears and movable between a first position, out of engagement with the gear, and a second position, in engagement with the gear;
  in which the gear is rotatable in the first position of the brake element and is not rotatable in the second position of the brake element; and
  an actuator engageable with the brake element and configured to move the brake element between its first and second positions, the actuator comprising:
   a chamber;
   a reciprocating piston disposed within the chamber; and
   an axially reciprocating rod secured to the piston, extending out of the chamber at its first end, the first end engageable with the brake element.

2. A system, comprising:
the apparatus of claim 1; and
an elongate drill string formed from a plurality of tubular pipe segments arranged in end-to-end engagement, the drill string rotationally coupled to the spindle.

3. A system, comprising:
the apparatus of claim 1; and
an elongate tubular pipe section rotationally coupled to the spindle.

4. The apparatus of claim 1, in which the carriage further comprises:
a spring disposed in a force transmitting relationship to the brake element;
in which the spring is in a relaxed position when the brake element is in the second position; and in which the spring is in a compressed position with the brake element is in the first position.

5. The apparatus of claim 4, in which at least a portion of the spring is disposed within the brake element and the gear.

6. The apparatus of claim 1, in which the rod is at least partially disposed within the brake element.

7. The apparatus of claim 1, in which the carriage further comprises:
a spring disposed in a force transmitting relationship to the brake element; in which at least a portion of the spring surrounds the rod.

8. The apparatus of claim 1, in which the frame is stationary and supported on a ground surface and has opposed ends; and in which the carriage is movable along the frame between the opposed ends of the frame.

9. The apparatus of claim 1, in which the brake element has an inner surface having a plurality of internal splines formed thereon, and an opposed outer surface having a plurality of external splines formed thereon.

10. The apparatus of claim 1, in which the brake element surrounds the gear in the second position.

11. The apparatus of claim 1, in which the carriage further comprises:
a brake cap, in which the brake cap is laterally offset from the brake element when the brake element is in the first position, and in which the brake cap surrounds and engages the brake element when the brake element is in the second position.

12. The apparatus of claim 11, in which the brake cap has an inner surface having a plurality of internal splines formed thereon.

13. The apparatus of claim 1, in which the spindle is tubular and further comprises:
a fluid supply element configured to furnish fluid to an interior of the spindle.

14. The apparatus of claim 1, in which the carriage further comprises:
- a spring surrounding the rod;
- in which the gear surrounds at least a portion of the spring and the rod; and
- in which the brake element surrounds at least a portion of the gear, the spring, and the rod when the brake element is in the second position.

15. The apparatus of claim 14, in which the carriage further comprises:
- a brake cap, in which the brake cap surrounds at least a portion of the brake element, the gear, the spring, and the rod when the brake element is in the second position.

16. A method of stopping rotation of a rotatable spindle included in a carriage supported on an elongate frame of a horizontal directional drilling machine, in which the carriage is movable along the frame, the method comprising:
- rotating the spindle using a series of intermeshed gears rotationally coupled to the spindle and a motor included in the carriage; and
- moving a brake element included in the carriage from a first position, out of engagement with the gear and in a laterally offset position with a break cap, to a second position, in engagement with the gear and the brake cap and surrounded by the brake cap, such that the brake element stops rotation of the intermeshed gears and the spindle.

17. The method of claim 16, further comprising:
moving the carriage from a first end of the frame to an opposed second end of the frame.

18. The method of claim 16, further comprising:
coupling an elongate pipe section to the spindle.

19. The method of claim 18, further comprising:
attaching the pipe section to a drill string made of a plurality of pipe sections attached in an end-to-end relationship.

20. An apparatus, comprising:
a horizontal directional drilling machine comprising:
- an elongate frame;
- a carriage movable along the frame and comprising:
  - a motor;
  - a rotatable spindle;
  - a series of intermeshed gears configured to rotationally couple the motor to the spindle;
  - a brake element disposed in a laterally offset relationship to one of the gears and movable between a first position, out of engagement with the gear, and a second position, in engagement with the gear;
  - in which the gear is rotatable in the first position of the brake element and is not rotatable in the second position of the brake element; and
  - a brake cap, in which the brake cap is laterally offset from the brake element when the brake element is in the first position, and in which the brake cap surrounds and engages the brake element when the brake element is in the second position.

* * * * *

UNITED STATES PATENT AND TRADEMARK OFFICE
CERTIFICATE OF CORRECTION

| | |
|---|---|
| PATENT NO. | : 11,708,725 B2 |
| APPLICATION NO. | : 17/352889 |
| DATED | : July 25, 2023 |
| INVENTOR(S) | : Metcalf et al. |

It is certified that error appears in the above-identified patent and that said Letters Patent is hereby corrected as shown below:

On the Title Page

ABSTRACT: Line 10, please delete "to".

In the Specification

Column 2, Line 23, please insert --the-- before the word "drill".
Column 3, Line 45, please delete "8o" and substitute therefor "80".
Column 3, Line 49, please delete "8o" and substitute therefor "80".
Column 5, Line 23, please insert --to-- after "64".

In the Claims

Column 6, Claim 4, Line 33, please delete "with" and substitute therefor "when".

Signed and Sealed this
Twelfth Day of September, 2023

Katherine Kelly Vidal
*Director of the United States Patent and Trademark Office*